US010044736B1

(12) United States Patent
Barger et al.

(10) Patent No.: US 10,044,736 B1
(45) Date of Patent: Aug. 7, 2018

(54) METHODS AND APPARATUS FOR IDENTIFYING AND CHARACTERIZING COMPUTER NETWORK INFRASTRUCTURE INVOLVED IN MALICIOUS ACTIVITY

(71) Applicant: ThreatConnect, Inc., Arlington, VA (US)

(72) Inventors: Richard M. Barger, Centreville, VA (US); Wade Baker, Leesburg, VA (US); Bhaskar V. Karambelkar, Ashburn, VA (US)

(73) Assignee: ThreatConnect, Inc., Arlington, VA (US)

( * ) Notice: Subject to any disclaimer, the term of this patent is extended or adjusted under 35 U.S.C. 154(b) by 170 days.

(21) Appl. No.: 15/271,901

(22) Filed: Sep. 21, 2016

Related U.S. Application Data

(60) Provisional application No. 62/221,465, filed on Sep. 21, 2015.

(51) Int. Cl.
| | | |
|---|---|---|
| H04L 29/06 | (2006.01) | |
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |

(52) U.S. Cl.
CPC ............ *H04L 63/14* (2013.01); *H04L 63/145* (2013.01); *H04L 63/1475* (2013.01)

(58) Field of Classification Search
None
See application file for complete search history.

(56) References Cited

U.S. PATENT DOCUMENTS

| | | | |
|---|---|---|---|
| 7,899,870 B2 | 3/2011 | Pearson et al. | |
| 8,260,914 B1 * | 9/2012 | Ranjan ................ | H04L 61/1511 709/224 |
| 8,631,489 B2 | 1/2014 | Antonakakis et al. | |

(Continued)

OTHER PUBLICATIONS

David Anderson, et al., "Spamscatter: Characterizing Internet Scam Hosting Infrastructure," 16th USENIX Security Symposium, University of California, San Diego, pp. 135-148 of the Proceedings, 2007.
Leyla Bilge, et al., Exposure: Finding Malicious Domains Using Passive DNS Analysis, NDSS, Feb. 2011.
Sergio Caltagirone, et al., "The Diamond Model of Intrusion Analysis," Center for Cyber Intelligence Analysis and Threat Research, 2013.

(Continued)

*Primary Examiner* — Eric Chen
(74) *Attorney, Agent, or Firm* — Cooley LLP

(57) ABSTRACT

In some embodiments, an apparatus includes a memory and a processor operatively coupled to the memory. The processor is configured to receive a set of domain name resolutions associated with a domain. Each domain name resolution from the set of domain name resolutions includes a mapping between a domain name and an Internet Protocol (IP) address. The processor is then configured to determine, based on the set of domain name resolutions, a set of resolution metrics associated with a first geolocation and a set of resolution metrics associated with a second geolocation. The processor is also configured to compare and identify a role of an adversary infrastructure at the first geolocation and a role of an adversary infrastructure at the second geolocation, and subsequently send a signal such that a remedy response associated with at least one of the set of IP addresses or the domain name is initiated.

19 Claims, 5 Drawing Sheets

(56) References Cited

U.S. PATENT DOCUMENTS

| | | | |
|---|---|---|---|
| 8,713,676 B2* | 4/2014 | Pandrangi | H04L 63/1416 726/22 |
| 8,973,141 B2 | 3/2015 | Rowland et al. | |
| 9,088,598 B1 | 7/2015 | Zhang et al. | |
| 9,171,151 B2 | 10/2015 | Behrendt et al. | |
| 9,185,127 B2* | 11/2015 | Neou | H04L 63/1441 |
| 9,294,498 B1 | 3/2016 | Yampolskiy et al. | |
| 2008/0320095 A1* | 12/2008 | Pearson | H04L 51/12 709/207 |
| 2009/0119280 A1* | 5/2009 | Waters | H04W 4/60 |
| 2012/0047153 A1* | 2/2012 | Thomas | G06F 17/30707 707/754 |
| 2013/0179555 A1* | 7/2013 | Neumann | H04L 69/28 709/223 |
| 2015/0026809 A1 | 1/2015 | Altman et al. | |
| 2015/0288711 A1 | 10/2015 | Jorgensen | |
| 2016/0021141 A1* | 1/2016 | Liu | H04L 63/1433 726/23 |
| 2016/0065620 A1* | 3/2016 | Liu | H04L 63/1408 726/1 |

OTHER PUBLICATIONS

Marco Cova, et al., "An Analysis of Rogue AV Campaigns," Springer Berlin Heidelberg, 2010.

Espionageware, "APT Attributions and DNS Profiling" Apr. 9, 2014. 8 pages. http://espionageware.blogspot.com/2014/04/apt-attributions-and-dns-profiling.html.

Hao, et al., "Monitoring the Initial DNS Behavior of Malicious Domains," IMC' 11, Nov. 2-4, 2011, Berlin, Germany, pp. 269-278.

Internet Wire, "Farsight Security Unveils World's First Real-Time Passive DNS Database," Oct. 2015.

Li, et al., "Finding the Linchpins of the Dark Web: a Study on Topologically Dedicated Hosts on Malicious Web Infrastructures," IEEE Xplore Digital Library, May 2013 http://ieeexplore.ieee.org/xpl/articleDetails.jsp?reload=true@arnumber=6547105.

LogicBoxes DNS DDoS issues on Jun. $9^9$— an update from LB, Jun. 13, 2015 https://support.netearthgroup.com/index.php?/News/NewsItem/View/1/logicboxes-dns-ddos.

PR Newswire, Palo Alto Networks Unveils AutoFocus Cyber Threat Intelligence Service, Mar. 2015.

* cited by examiner

METHODS AND APPARATUS FOR IDENTIFYING AND CHARACTERIZING COMPUTER NETWORK INFRASTRUCTURE INVOLVED IN MALICIOUS ACTIVITY

CROSS REFERENCE TO RELATED APPLICATIONS

The application claims priority to provisional application U.S. Ser. No. 62/221,465 filed on Sep. 21, 2015 and entitled "Methods And Apparatus For identifying and Characterizing The Role Of infrastructure Involved In A Malicious Software Campaign", which is incorporated herein by reference in its entity.

BACKGROUND

Some embodiments described herein relate generally to methods and apparatus for analysis of computer network data related to data security. More particularly, the embodiments described herein relate to methods and apparatus for identifying and characterizing a role of infrastructure involved in malicious activity (such as a malicious software campaign).

When conducting malicious software campaigns, adversaries will often use dynamic infrastructure (e.g., domains, Internet Protocol (IP) Addresses, Uniform Resource Locators (URLs), email services, messaging services, chat services, social media, general web services and/or protocols) to improve the survivability and mobility of custom malware. Specifically, dynamic domain infrastructure used by an adversary can be used for a variety of purposes and roles that can vary over time. Dynamic infrastructure can allow adversaries to quickly shift their remote command and control to new hosts. This also allows adversaries to disrupt investigations and traceability of their operation.

Accordingly, to aid in tracking and identifying network exploitation operators, a need exists for systems and methods for identifying and classifying infrastructure used by adversaries in a malicious software campaign.

SUMMARY

In some embodiments, an apparatus includes a memory and a processor operatively coupled to the memory. The processor is configured to receive, from a domain name system sensor, a set of domain name resolutions associated with a domain within a time period. Each domain name resolution from the set of domain name resolutions includes a mapping between a domain name and an Internet Protocol (IP) address (e.g., IPv4 or IPv6) from a set of IP addresses at a time stamp within the time period. Each IP address from the set of IP addresses is associated with a geographic location from a set of geographic locations (as well as an Autonomous System Number (ASN), a primary Internet Service Provider (ISP) or a sublease(s)). The processor is then configured to determine, based on the set of domain name resolutions, a set of resolution metrics associated with a first geographic location from the set of geographic locations and the domain and a set of resolution metrics associated with a second geographic location from the set of geographic locations and the domain. The processor is also configured to compare the set of resolution metrics associated with the first geographic location and the set of resolution metrics associated with the second geographic location. Subsequently, the processor is configured to identify, based on the comparison, a role of an adversary infrastructure at the first geographic location and a role of an adversary infrastructure at the second geographic location. The processor is configured to send a signal based on the role of the adversary infrastructure at the first geographic location and the role of the adversary infrastructure at the second geographic location such that a remedy response associated with at least one of the set of IP addresses or the domain name is initiated.

DETAILED DESCRIPTION

Figure 1:
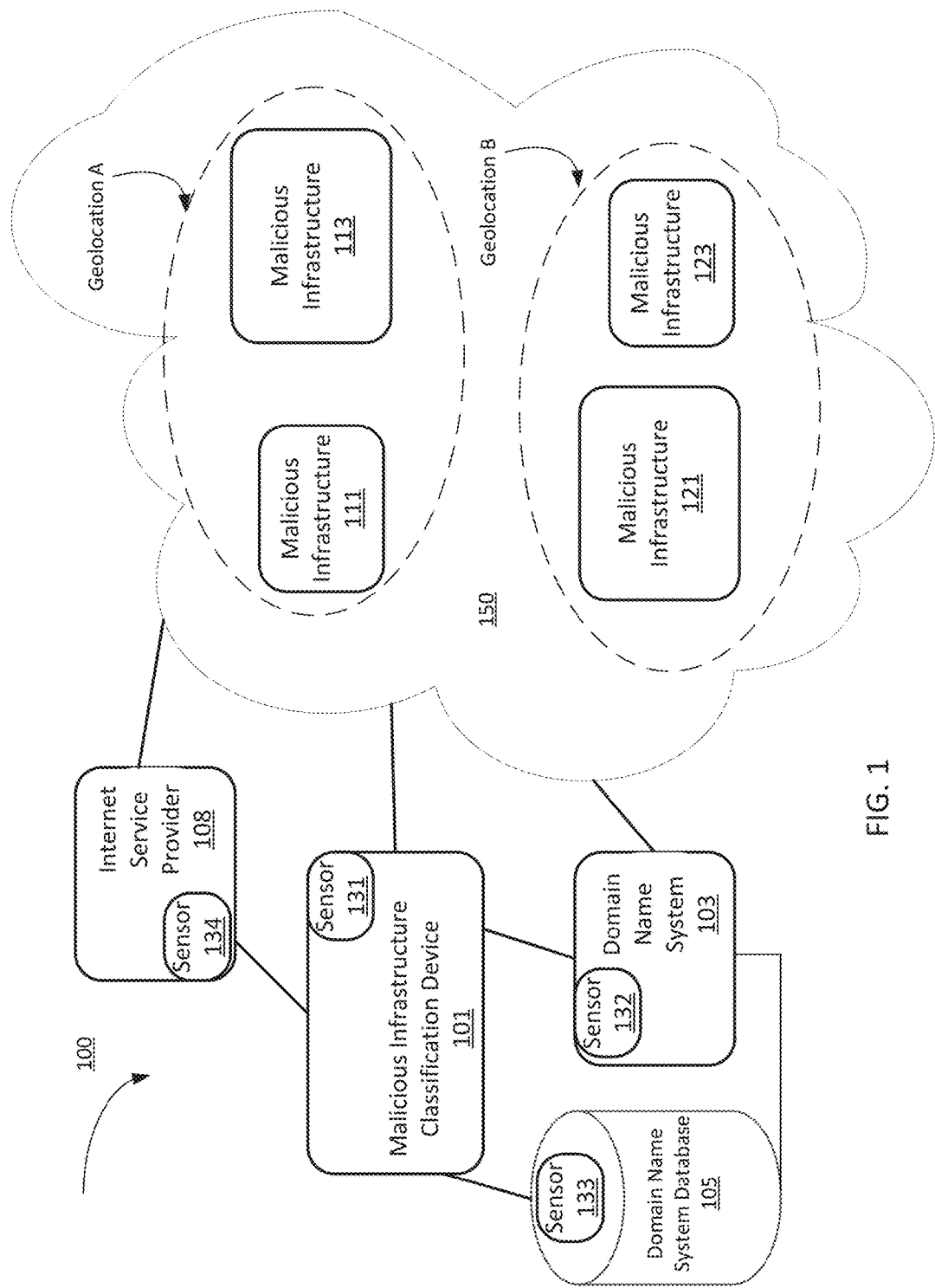
FIG. 1 is a schematic block diagram of a malicious infrastructure classification system, according to an embodiment.

In some embodiments, a malicious infrastructure classification system can collect, identify and receive data (e.g., domain name system (DNS) resolution information) associated with the infrastructure used by an adversary in a malicious software campaign. The domain name system (DNS) resolution information can include, for example, the different IP addresses to which a specific domain resolves over time. In some instances, the DNS resolution information can also include various information associated with a specific domain as discussed herein (e.g., port services information, ASN information, ISP information, etc.). The malicious infrastructure classification system can analyze such DNS resolution information to determine a set of resolution metrics, including, for example, an amount of time or duration the domain resolves to each IP address before resolving to another IP address, the geographic location associated with each IP address to which the domain resolves, and a number of resolutions to a specific geographic location within a time period. By analyzing and comparing the set of resolution metrics among different geographic locations, the malicious infrastructure classification system can classify the infrastructure (e.g., a central hub role, a parking role, a target role, an entrusted role, a source origin role, a midpoint role, a midpoint redirector role, a midpoint command and control role, or a suspicious role) involved in the malicious software campaign and take remedy responses accordingly. In some implementations, instead of being determined by the malicious infrastructure classification system, the role of the adversary and/or malicious infrastructure can also be self-defined and/or self-characterized by a user. For example, by reviewing the DNS resolution information, an analyst can identify and/or characterize a role of adversary and/or malicious infrastructure.

In some embodiments, an apparatus includes a memory and a processor operatively coupled to the memory. The processor is configured to receive, from a domain name system sensor, a set of domain name resolutions associated with a domain within a time period. Each domain name resolution from the set of domain name resolutions includes a mapping between a domain name and an IP address from a set of IP addresses at a time stamp within the time period. Each IP address from the set of IP addresses is associated with a geographic location from a set of geographic locations. The processor is then configured to determine, based on the set of domain name resolutions, a set of resolution metrics associated with a first geographic location from the set of geographic locations and the domain and a set of resolution metrics associated with a second geographic location from the set of geographic locations and the domain. The processor is also configured to compare the set of resolution metrics associated with the first geographic location and the set of resolution metrics associated with the second geographic location. Subsequently, the processor is configured to identify, based on the comparison, a role of an adversary infrastructure at the first geographic location and a role of an adversary infrastructure at the second geographic location. The processor is configured to send a signal based on the role of the adversary infrastructure at the first geographic location and the role of the adversary infrastructure at the second geographic location such that a remedy response associated with at least one of the set of IP addresses or the domain name is initiated.

In some embodiments, an apparatus includes a memory and a processor operatively coupled to the memory. The processor is configured to receive, from a domain name system sensor, a set of domain name resolutions associated with a domain within a time period. Each domain name resolution from the set of domain name resolutions includes a mapping between a domain name and an IP address from a set of IP addresses at a time stamp within the time period. Each IP address from the set of IP addresses is associated with a geographic location from a set of geographic locations. The processor is configured to determine, based on the set of domain name resolutions, a set of resolution metrics associated with (1) the domain and (2) a geographic location from the set of geographic locations, the set of resolution metrics including a first resolution metric associated with the geographic location and a second resolution metric associated with the geographic location. The processor is then configured to determine a ratio between the first resolution metric and the second resolution metric. Subsequently, the processor is configured to identify, based on the ratio, a role of an adversary infrastructure at the geographic location. The processor is configured to send a signal based on the role of the adversary infrastructure at the geographic location such that a remedy response associated with the adversary infrastructure at the geographic location is initiated.

In some embodiments, a non-transitory processor-readable medium stores code representing instructions to be executed by a processor. The code includes code to cause the processor to receive, from a domain name system sensor, a set of domain name resolutions associated with a domain within a time period. Each domain name resolution from the set of domain name resolutions includes a mapping between a domain name and an Internet Protocol (IP) address from a set of IP addresses at a time stamp within the time period. Each IP address from the set of IP addresses is associated with the domain and a geographic location from a set of geographic locations. The non-transitory processor-readable medium further includes code to cause the processor to determine, based on the set of domain name resolutions, a resolution metric from a set of resolution metrics associated with each geographic location from the set of geographic locations. The non-transitory processor-readable medium also includes code to cause the processor to determine a ratio between the resolution metric associated with a specific geographic location from the set of geographic locations and a collective value of the resolution metric associated with the set of geographic locations. In addition, the non-transitory processor-readable medium includes code to cause the processor to identify, based on the ratio, a role of an adversary infrastructure at the specific geographic location. The non-transitory processor-readable medium further includes code to cause the processor to send a signal based on the role of the adversary infrastructure at the specific geographic location such that a remedy response associated with adversary infrastructure at the specific geographic location is initiated.

As used herein, a module can be, for example, any assembly and/or set of operatively-coupled electrical components, and can include, for example, hardware like a memory, a processor, software (executing in hardware), and/or the like. As used herein, the singular forms "a," "an" and "the" include plural referents unless the context clearly dictates otherwise. Thus, for example, the term "a domain name system" is intended to mean a single domain name system or a set of domain name systems with similar functionalities. For another example, the term "a malicious infrastructure" is intended to mean a single malicious infrastructure or a set of malicious infrastructure with similar functionalities.

FIG. 1 is a schematic block diagram of a malicious infrastructure classification system 100, according to an embodiment. In such embodiments, the malicious infrastructure classification system 100 can include a malicious infrastructure classification device 101, a domain name system 103, an internet service provider 108, a domain name system database 105, a set of domain name system sensors (e.g., 131-134), and a network 150. The malicious infrastructure classification device 101 can be operatively coupled to each of the domain name system 103, the domain name system database 105, the internet service provider 108, and the network 150. The domain name system 103 and the internet service provider 108 can also be operatively coupled to the network 150.

In some embodiments, the network 150 can be any network or combination of networks capable of transmitting communication information (e.g., data and/or signals) and can include, for example, an Ethernet network, the Internet, a fiber-optic network, a wireless network, and/or a cellular network. The communication information can be transmitted over a wireless network, such as, for example, a Wi-Fi® or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

The network 150 can enable communications between compute devices from remote geographic locations (or geo-locations). A malicious software campaign can use compute devices (e.g., malicious infrastructure 111, 113, 121, 123) from different geolocations (e.g., geolocation A and geolocation B) to spread (or transmit), via the network 150, malicious (adverse, illegal, and/or unauthorized) information (data, documents, files, and/or software) to target compute devices (not shown).

The malicious infrastructure (e.g., 111, 113, 121, 123) can be any compute device that has processing capabilities. For example, in some instances, the malicious infrastructure (e.g., 111, 113, 121, 123) can be a server such as, for example, a web server, an application server, a proxy server, a telnet server, a file transfer protocol (FTP) server, a mail server, a list server, a collaboration server and/or the like. In other instances, the malicious infrastructure (e.g., 111, 113, 121, 123) can be a personal computing device such as a desktop computer, a laptop computer, a personal digital assistant (PDA), a standard mobile telephone, a tablet personal computer (PC), and/or so forth. The malicious infrastructure (e.g., 111, 113, 121, 123) can also be virtual machines or software that can run on a physical compute device. In some instances, the malicious software campaign can use the malicious infrastructure (e.g., 111, 113, 121, 123) they own to transmit malicious information. In other instances, the malicious software campaign can use malicious infrastructure (e.g., 111, 113, 121, 123) from another adversary source or a legitimate source to transmit the malicious information. In such instances, the malicious infrastructure (e.g., 111, 113, 121, 123) can be used legitimately (i.e., transmit legitimate/authorized information) in part and maliciously in part (i.e., transmit malicious information). In some instances, the malicious infrastructure (e.g., 111, 113, 121, 123) can he used in a non-malicious manner by a malicious actor. For example, the malicious actor may use the malicious infrastructure (e.g., 111, 113, 121, 123) to park the domain while the malicious actor is not actively using the domain for malicious purposes. The malicious infrastructure (e.g., 111, 113, 121, 123) can be any device used as part of a malicious act regardless of whether the isolated acts performed by that malicious infrastructure are malicious (e.g., 111, 113, 121, 123).

The internet service provider (ISP) 108 can provide internet and/or network 150 access to the malicious infrastructure classification system 100 and/or other compute devices. The malicious software campaign can use the malicious infrastructure (e.g., 111, 113, 121, 123) to transmit malicious information to target compute devices (not shown) via an internet, access to which is provided to the compute devices by the ISP 108. The malicious infrastructure classification device 101 can be operatively coupled to the ISP 108.

The domain name system (DNS) 103 can be a hardware-based module (e.g., a server, a computer, a field-programmable gate array (FPGA), an application specific integrated circuit (ASIC), a digital signal processor (DSP)) and/or software-based module (e.g., a module of computer code stored in memory and/or executed at a processor). The DNS 103 is a naming system for computers, services or any resource connected to the network 150. The DNS 103 can associate various information with domain names assigned to an entity (e.g., the malicious software campaign). The domain name (also referred to herein as "domain" or "malicious domain") can be an identification string (e.g., www.thisisvirus.com) used to identify internet resources (or infrastructure, such as computers, networks, and services). In some implementations, the DNS 103 can be a hierarchical system including a root domain name server, a top-level domain name server and/or a set of lower-level domain name servers. In some implementations, the DNS 103 includes a DNS resolver component (not shown), which can be a hardware or a software component executed on hardware configured to initiate and sequence queries that result in the translation (resolution, mapping) of a domain name into an IP address (e.g., IPv4 or IPv6). The DNS query can be either non-recursive, recursive, iterative, or a combination of the above.

The DNS 103 can resolve (translate, map, associate) a domain name to a numerical Internet Protocol (IP) address (e.g., an IPv4 address such as 123.45.678.9, or an IPv6 address such as 2001:0DB8:AC10:FE01). In other instances, the DNS 103 can also perform a reverse domain lookup to identify a domain using an IP address as an input. In some instances, a domain name can be uniquely associated with a static IP address. In other words, the infrastructure that hosts the domain name remains the same. In other instances, for example, the malicious software campaign can dynamically change the infrastructure that hosts the domain name, and thus, the IP address associated with the infrastructure changes over time. In some instances, the domain to be analyzed can be known and/or suspected to be malicious and/or associated with a malicious actor and/or software campaign. In such instances, data associated with this known and/or suspected malicious domain can be collected and analyzed. In other instances, the malicious infrastructure classification device 101 (described in further detail herein) can classify and/or identify malicious actors based on domain name resolution information. For example, if a large number of IP addresses is used for a single domain, the malicious infrastructure classification device 101 may classify the device as potentially malicious. In such instances, data associated with this potentially malicious domain can be further collected and analyzed.

In some implementations, the DNS 103 (or a sensor 132 at the DNS) can collect (identify) domain name resolution information associated with a domain, such as different IP addresses to which a specific domain resolves over time, an amount of time or duration the domain resolves to each IP address before resolving to another IP address, the geographic location associated with each IP address to which the domain resolves, the service provider reputation based on prior domain name resolutions, a number of DNS resolutions for that specific location over a period of time, and/or services (open ports or port services) used by the host (i.e., malicious infrastructure). In addition to such DNS resolution information, in some implementations, DNS 103 (or a sensor 132 at the DNS) can also collect and/or receive additional contextual information (e.g., geolocation information, autonomous system number (ASN) information, etc.) or derivative metrics (e.g., the total time associated with DNS resolutions within a particular geographic location, total number of IP addresses used within a specific geographic location, the number of times each IP address is used, and/or a time of a day of each resolution to a geographic location within the time period (e.g., morning, afternoon, night)).

As used herein, the term "DNS resolution" refers to mappings between a domain and an IP address. Each time DNS records indicate that the domain resolves to a different IP address, it is one resolution (also referred to herein as "switch," "transition," "translation", or "mapping"). As used herein, the term "resolution duration" refers to the amount of time (e.g., in days, hours, minutes, seconds, etc.) DNS records show the domain resolved to a given IP address before changing to another IP address.

The domain name system (DNS) database 105 can be any type of database that stores domain name resolution data. The DNS database 105 can be implemented as, for example, a relational database, a graph database, a table, a list, or any other suitable data structure. The domain name resolution data stored at the DNS database 105 can be received from multiple sources, for example, but not limited to, the domain name system 103, the internet service provider 108, the malicious infrastructure classification device 101, and/or the set of DNS sensors (131-134).

The domain name system (DNS) sensors (131, 132, 133, 134) can be hardware-based modules (e.g., a server, a computer, a field-programmable gate array (FPGA), an application specific integrated circuit (ASIC), a digital signal processor (DSP)) and/or software-based modules (stored in memory and/or executed at a processor). The DNS sensors (131, 132, 133, 134) can be located at various devices and/or places within the network such as, for example, at DNS 103, DNS database 105, ISP 108, the malicious infrastructure classification device 101, a firewall (not shown), and/or the like. In some implementations, the DNS sensors (131, 132, 133, 134) can actively send queries to, for example, the DNS 103, the DNS database 105, the ISP 108, the malicious infrastructure classification device 101, and/or any compute device within the network 150, to retrieve (or collect) domain name resolution data and/or perform domain name resolutions (e.g., translate a domain name to an IP address, or translate an IP address to a domain name). For example, the DNS sensors (131, 132, 133, 134) can actively and periodically query the DNS 103 to resolve the domain. In this manner, the DNS sensors (131, 132, 133, 134) can obtain an IP address from the DNS 103 currently associated with the domain. This allows the DNS sensors (131, 132, 133, 134) to actively collect DNS resolution information associated with a domain. In such instances, the DNS sensors (131, 132, 133, 134) can be said to be active DNS sensors.

In other implementations, the DNS sensors (131, 132, 133, 134) do not actively send and/or initiate DNS queries. Instead, the DNS sensors (131, 132, 133, 134) can passively receive domain name resolution data, for example, by monitoring the network traffic when other entities (e.g., the malicious infrastructure classification device 101, the DNS 103, the ISP 108, and/or any compute device within the network 150) query the DNS 103. For example, the DNS sensors 131, 132, 133, 134 can intercept and/or monitor traffic sent to and/or from the DNS 103 to identify (e.g., via packet inspection) to what IP address a domain resolves. The DNS sensors (131, 132, 133, 134) can be placed at different locations within the malicious infrastructure classification system 100, for example, at the malicious infrastructure classification device 101, the DNS 103, the ISP 108, and/or any compute device within the network 150.

In some instances, the malicious infrastructure classification system 100 includes both passive and active DNS sensors (131, 132, 133, 134), Moreover, in some instances, each sensor (131, 132, 133, 134) is controlled and/or operated by a single party. In other instances, the sensors (131, 132, 133, 134) are controlled and/or operated by various parties, which share information collected by the sensors (131, 132, 133, 134). The DNS resolution information (and/or a set of resolution metrics) can include, for example, the different IP addresses to which the malicious domain resolves over time (i.e., a timeline of resolutions to the malicious domain), an amount of time or duration the domain resolves to each IP address before resolving to another IP address, the geographic location associated with each IP address to which the domain resolves, a number of resolutions to a specific geographic location within a time period, the server provider reputation based on resolutions, services (open ports or port services) used by the host (i.e., malicious infrastructure), autonomous system number (ASN) information, the total time associated with DNS resolutions within a particular geographic location, total number of IP addresses used within a specific geographic location, the number of times each IP address is used, and/or a time of a day of each resolution to a geographic location within the time period (e.g., morning, afternoon, night).

The malicious infrastructure classification device 101 can be any combination of hardware-based module (e.g., a field-programmable gate array (FPGA), an application specific integrated circuit (ASIC), a digital signal processor (DSP)) and/or software-based module (computer code stored in memory and/or executed at the processor 220). The malicious infrastructure classification device 101 (e.g., a processor of the malicious infrastructure classification device 101) can be configured to collect (and store) DNS data from the ISP 108, the DNS 103, the DNS database 105, any compute device within the network 150, and/or the set of DNS sensors (131-134). The malicious infrastructure classification device 101 (e.g., a processor of the malicious infrastructure classification device 101) can be configured to analyze the DNS data to identify and characterize a role of infrastructure (e.g., malicious infrastructure 111, 113, 121, 123) involved in the malicious software campaign. The malicious infrastructure classification device 101 (e.g., a processor of the malicious infrastructure classification device 101) can be configured to generate and send a signal such that a remedy response associated with the malicious software campaign can be initiated.

In use, when a target device (e.g., a computer, a laptop, a mobile computer device) is attacked by malware (e.g., hostile or intrusive software, computer viruses, worms, trojan horses, or decoy documents) during, for example, a malicious software campaign, the target device can be programed by the malware to send and/or receive information to and/or from a malicious domain with which the malware is associated. By analyzing (identifying or classifying) the infrastructure that host the malicious domain, one can learn about the malware, the malicious software campaign, and/or the operator(s) who manages and controls the malicious software campaign. Accordingly, actions and/or remedy responses can be taken to prevent future malware attacks.

In some implementations, the DNS 103 and/or the set of DNS sensors (e.g., 131-134) can send the timeline of resolutions (and/or a set of domain name resolutions each including a time stamp and a mapping between a domain name and an IP address) to the malicious infrastructure classification device 101, and the malicious infrastructure classification device 101 (e.g., a processor of the malicious infrastructure classification device 101) can then analyze the data to determine, calculate and/or identify the set of resolution metrics. In another implementation, the DNS 103 and/or the set of DNS sensors (e.g., 131-134) can determine a set (or a subset) of resolution metrics based on the timeline of resolutions and send the timeline of resolutions and the set (or the subset) of resolution metrics to the malicious infrastructure classification device 101 to determine more resolution metrics and/or to perform the malicious infrastructure classification process, as discussed with respect to FIG. 5.

After the DNS resolution information (and/or a set of resolution metrics) is received, the malicious infrastructure classification device 101 (e.g., a processor of the malicious infrastructure classification device 101) can normalize the data (e.g., remove duplicate data, normalize time information, etc.) and concatenate the normalized data together for further processing (and/or analyzing) at the malicious infrastructure classification device 101 (e.g., by a processor of the malicious infrastructure classification device 101). By analyzing such data, the malicious infrastructure classification device 101 (e.g., a processor of the malicious infrastructure classification device 101) can classify the infrastructure associated with the malicious domain of the malicious software campaign, as described in further detail herein.

In some implementations, the malicious infrastructure classification device 101 (e.g., a processor of the malicious infrastructure classification device 101) can compare a set of resolution metrics of a first geographic location with the set of resolution metrics associated with the second geographic location to determine a ratio. Based on the ratio, the malicious infrastructure classification device 101 (e.g., a processor of the malicious infrastructure classification device 101) can identify a role of an adversary infrastructure at the first geographic location and/or a role of an adversary infrastructure at the second geographic location. The malicious infrastructure classification device 101 (e.g., a processor of the malicious infrastructure classification device 101) can subsequently send a signal based on the role of the adversary infrastructure at the first geographic location and/or the role of the adversary infrastructure at the second geographic location such that a remedy response associated with at least one of the set of IP addresses or the malicious domain is initiated.

Figure 3:
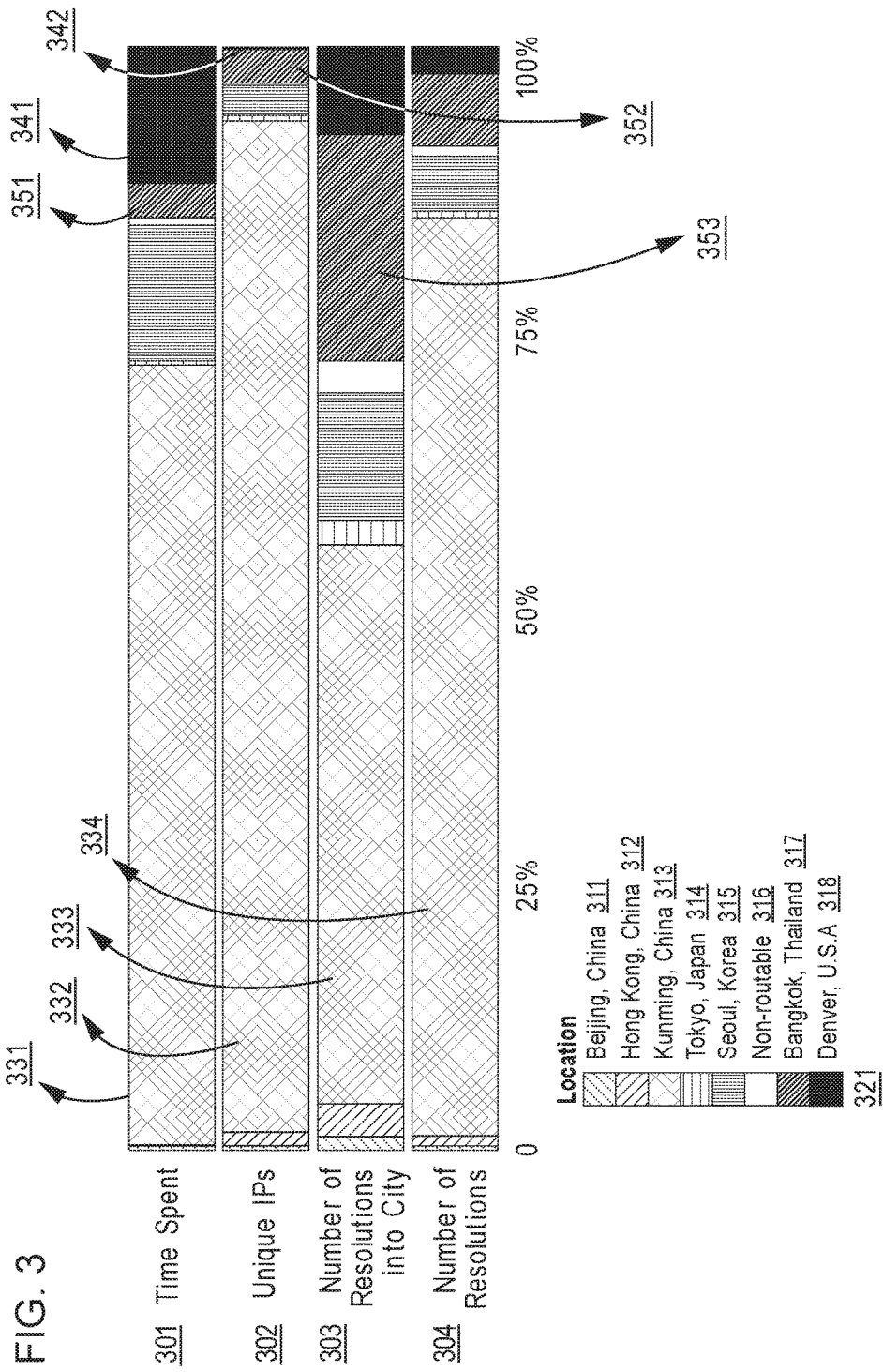
FIG. 3 is a graph illustrating metric-centric comparisons of a set of resolution metrics among different geographic locations for an example malicious software campaign, according to an embodiment.

For example, FIG. 3 shows a graph illustrating metric-centric comparisons of a set of resolution metrics among different geographic locations for an example malicious software campaign, according to an embodiment. In this example, based on the set of IP addresses to which the malicious domain (i.e., a single malicious domain in this example) resolves over time within a time period (e.g., a time period of five years) (i.e., timeline of resolutions), which can be obtained by the DNS 103 and/or the set of DNS sensors (e.g., 131-134), the malicious infrastructure classification device 101 (e.g., a processor of the malicious infrastructure classification device 101) can determine a set of resolution metrics including, but not limited to, total time spent at each geographic location 301, a number of unique IP addresses resolved at each geographic location 302, a number of resolutions into each geographic location 303 (i.e., a number of resolution movements between cities, omitting subsequent intra-city IP hopping), and a number of resolutions at each geographic location 304 (i.e., a total number of resolution movements including intra-city IP hopping). In some implementations, the set of resolution metrics can also include a movement pattern of resolutions (e.g., domain resolves to a first IP address at geographical location A, then to a second IP address at geographical location A, then to a third IP address at geographical location A, then to an IP address at geographical location B, then back to a fourth IP address at geographical location A, etc.) The set of geographic locations associated with the set of IP addresses in this example include Beijing, China 311, Hong Kong, China 312, Kunming, China 313, Tokyo, Japan 314, Seoul, Korea 315, Non-routable 316, Bangkok, Thailand 317, and Denver, U.S.A. 318.

In some implementations, the malicious infrastructure classification device 101 (e.g., a processor of the malicious infrastructure classification device 101) can compare a resolution metric from the set of resolution metrics among the set of geographic locations to determine a ratio 321. In this example, the ratio associated with a specific resolution metric (also referred to herein as "metric-centric ratio") is determined to be the percentage of that resolution metric of a geographic location among the same resolution metric of all geographic locations. Similar stated, adding together the percentages of a resolution metric of all geographic locations results in 100%. For example, the ratio of the time spent resolving to IPs in Kunming 331 is the time spent resolving to IPs in Kunming 331 over the time spent resolving to IPs in all geographic locations (311-318). In some implementations, the malicious infrastructure classification device 101 (e.g., a processor of the malicious infrastructure classification device 101) can compare a resolution metric of a first geographic location with the resolution metric of a second geographic location to determine a ratio. In other implementations, the malicious infrastructure classification device 101 (e.g., a processor of the malicious infrastructure classification device 101) can compare a first resolution metric of a specific geographic location with a second resolution metric of the same geographic location to determine a ratio (e.g., as shown and described with respect to FIG. 4). In yet other implementations, the malicious infrastructure classification device 101 (e.g., a processor of the malicious infrastructure classification device 101) can compare a resolution metric of a geographic location from a set of geographic locations with a collective value (or an average value) of the resolution metric associated with the set of geographic locations to determine a ratio. In still other implementations, multiple different ratios and/or combination of ratios can be determined based on geographic locations, resolution metrics, collective values, and/or the like.

Varying ratios among the resolution metrics reflect the geographic location's purpose, function, role, and/or status, within the larger infrastructure or the malicious software campaign. Similarly stated, the malicious infrastructure classification device 101 (e.g., a processor of the malicious infrastructure classification device 101) can determine varying ratios among the resolution metrics to determine that different cities and/or compute devices (e.g., host devices) are used for different purposes in the malicious software campaign. A role of an adversary infrastructure in the malicious software campaign can include, but is not limited to, a central-hub role, a parking role, a target role, a victim role, an untrusted role, a suspicious role, a source origin role, a midpoint role, a midpoint redirector role, a midpoint command and control (C2) role, and/or the like. A status of an adversary infrastructure in the malicious software campaign can include, but not limited to, active, inactive, abandoned, parked, and/or the like. In some implementations, the malicious infrastructure classification device 101 (e.g., a processor of the malicious infrastructure classification device 101) can identify a role of the adversary infrastructure at a geographic location based on one ratio or more than one ratio. In some implementations, instead of being determined by the ratios, the role of the adversary infrastructure can also be self-defined and/or self-characterized by a user.

For example, a high ratio of resolutions for a given location (303, 304) indicates a high level of access, control, and comfort for an operator of the malicious software campaign (also referred to herein as "a central hub role"). For another example, a low ratio of unique IP addresses for a given location 302, together with a high ratio of time spent resolving to the IP addresses for the given location 301, indicates that the infrastructure at the given location is likely used when the malicious domain is offline for a given time or the malicious domain is not interacting with routable infrastructure (also referred herein to as "a parking role"). In some implementations, a parking role also indicates that the malicious domain stagnates, or the malicious domain does not dynamically route and/or maintains a static resolution with a set of malicious domains that were previously identified.

Specifically, as shown in FIG. 3, four cities, Kunming 313, Seoul 315, Bangkok 317, and Denver 318, exhibiting different characteristics of the resolution metrics compared to the other cities, are major cities of interests to understand the context and role of the malicious domain infrastructure. Kunming shows a high ratio of the number of resolutions into the city 333, a high ratio of transitions between Kunming IP addresses 334, a high ratio of time spent in Kunming 331, and more infrastructure use in Kunming 332 (evidenced by a high ratio of unique IP addresses). This indicates that the malicious software campaign has a high degree of control and ownership of the infrastructure in Kunming. Similarly stated, Kunming likely plays a central-hub role in the malicious software campaign. In contrast, while the malicious domain resolves to a single IP address in Denver 342 (shown as a small orange section 342 at the end of the unique IPs 302 portion of the chart), the time spent resolving to this IP address at Denver 341 is disproportionally large. In fact, in this example, Denver's single IP address included average resolution durations per IP address more than six times that of Kunming and more than double the next-closest location, Seoul, Korea. This can indicate that Denver is used in a parking role (i.e., used by the adversary when the malicious software campaign is not active).

When a pattern of brief, periodic resolutions to recurring IPs in a given location is observed, it can indicate quick connectivity checks by the operator of the malicious software campaign to see if victims are beaconing in or the presence of unfavorable operational conditions. Thus, this can indicate a location being targeted by the adversary. As shown in FIG. 3, there are a large number of resolutions 353 into Bangkok 317, but a disproportionate number of unique IP addresses 352 is used and a disproportionately small amount of time 351 is spent resolving to these IP addresses. Thus, Bangkok is likely a target of this malicious software campaign.

Figure 4:
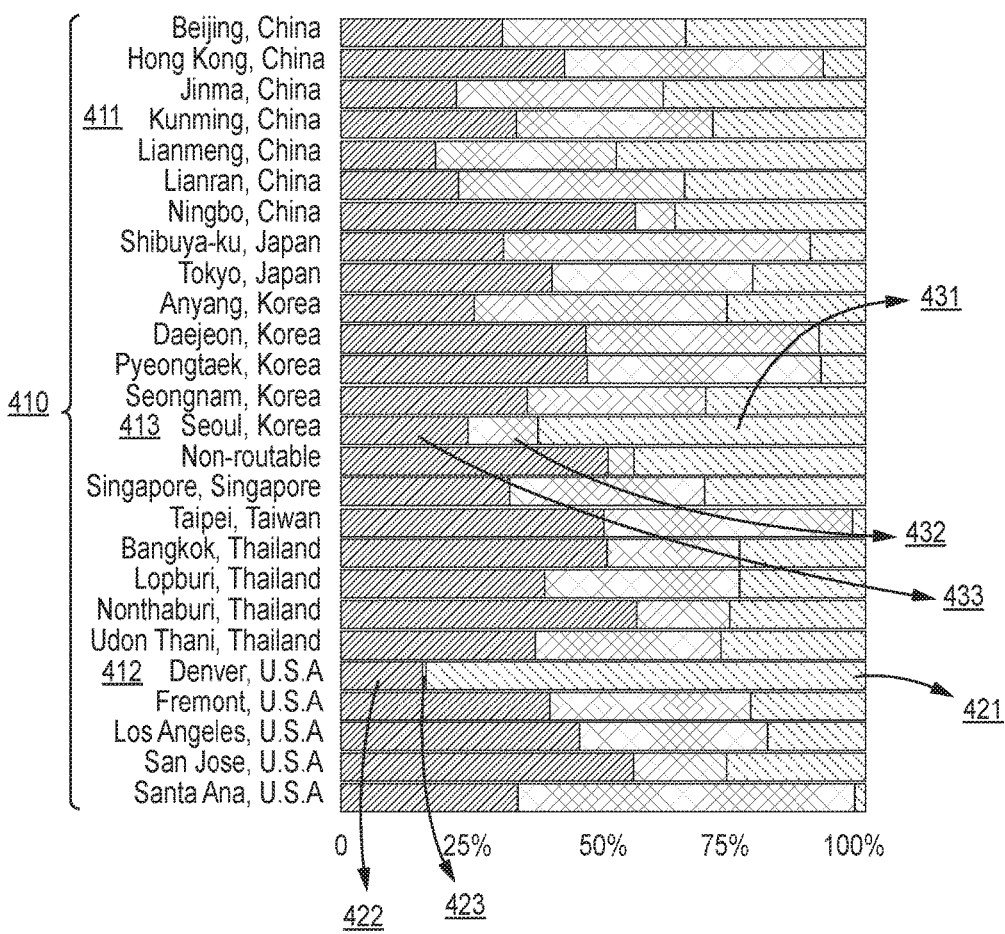
FIG. 4 is a graph illustrating city-centric comparisons of a set of resolution metrics among different geographic locations for an example malicious software campaign, according to an embodiment.

For another example, FIG. 4 is a graph illustrating city-centric comparisons of a set of resolution metrics among different geographic locations for an example malicious software campaign, according to an embodiment. Each bar at 410 represents a normalized ratio and/or comparison of three resolution metrics of a geographic location. The three resolution metrics include a number of resolutions at each geographic location 401 (i.e., a number of resolution movements within the city or intra-city IP hopping), a number of unique IP addresses resolved at each geographic location 402, and total time spent at each geographic location 403. Each value is normalized so it can be compared with the other values for each geographic location. This allows a determination of disproportionate use of one of the three resolution metrics as compared to the other resolution metrics for that geographic location. Each geographic location from the set of geographic locations 410 is associated with at least one IP address to which the malicious domain resolves within the time period.

Specifically, a high ratio of unique IP addresses 402 with a high ratio of time spent indicates regional investment and/or control, and that infrastructure at that geographic location is easy to obtain. It also suggests a high degree of ownership of the infrastructure. Because Kunming 411 falls into this classification, it indicates that the person controlling the malicious domain likely lives and/or operates in Kunming.

As discussed earlier, in some implementations, the malicious infrastructure classification device 101 (e.g., a processor of the malicious infrastructure classification device 101) can compare a first resolution metric of a specific geographic location with a second resolution metric of the specific geographic location to determine a ratio. For example, as shown in FIG. 4, when the ratio of time resolved (e.g., 421, 431) of a geographic location (e.g., Denver 412 or Seoul 413, respectively) is comparably higher than the number of resolutions (e.g., 422, 432) or unique IP addresses (e.g., 423, 432), the adversary likely has decided to keep the malicious domain static for long periods of time. This can occur when the network exploitation operator (or the operator of the malicious software campaign) is offline for a given time or not interacting with routable infrastructure. Based on the data, it can be shown that this occurs in Denver 412 and Seoul 413 (i.e., the time spent is disproportional to the number of resolutions and the unique IPs.) Thus, it can be determined that Denver and Seoul were used as "parking" locations, or that the adversary infrastructure at Denver and Seoul have a role of "parking". In some implementations, the role of "parking" can also be identified and/or validated by analysis of service providers (e.g., ISPs) and/or available service ports.

As discussed above with respect to FIG. 3 and FIG. 4, at least three roles (or patents, or profiles) of an adversary infrastructure are associated with the malicious software campaign. First, the role of an adversary infrastructure can be local IP switching. Specifically, the adversary infrastructure at Kunming can have a role of local IP switching, with a large number of fleeting resolutions to single-use IPs throughout the time frame. This suggests a deep relationship between the adversary and the city of Kunming, and it may also indicate a lack of operational security or oversight at Kunming. It also indicates that the person controlling the malicious domain likely lives in or near Kunming and has installed a client that automatically obtains Kunming-based IP addresses from the local service provider's address pool when a remote connection (e.g., a virtual private network (VPN) connection) is not active.

Second, the role of an adversary infrastructure can be remote command/control (C2). Specifically, brief, periodic resolutions to recurring IPs in a given location can indicate routine intelligence collections on target devices in the given location. The operator of the malicious software campaign can likely connect to target devices for traditional remote C2 and exit after acting on the target devices. It can be determined that the more hasty exits may simply be a by-product of quick connectivity checks to see if victims (or target devices) are beaconing in. Alternatively, it is likely that the operator of the malicious software campaign may not be experiencing favorable operational conditions. Some examples include network saturation and subsequent latency or the C2 IP address being blocked, forcing the operator of the malicious software campaign to transition to a different C2 IP address to reacquire access to the victim compute devices.

Third, the role of an adversary infrastructure can be domain parking. Specifically, patterns observed in Denver, Seoul, and non-routable suggest they are likely used when the malicious domain is either offline for a given time or not interacting with routable infrastructure, or a domain parking role. They are the locations where total time resolved is disproportionately higher than unique IPs and resolutions. Seoul may include multiple roles, where some of Seoul's multiple IPs are most likely used for adversary domain parking, while others appear to be traditional remote C2 hosts.

In some instances, other resolution metrics (e.g., the server provider reputation based on resolutions, services (open ports or port services) used by the host (i.e., malicious infrastructure), geographic location reputation, and/or autonomous system number (ASN) information) can be used in the analysis to classify an adversary infrastructure. For example, if the services that an infrastructure associated with an IP address use are provided by service providers with bad reputations, the role of the infrastructure is more likely to be untrusted. On the other hand, if the services that an infrastructure associated with an IP address use are from trusted service providers, the role of the infrastructure is less likely to be untrusted. For another example, if the port services used by an IP address are generally web services that provides substantially constant content, this could indicate a parking role. If, however, the port services used by an IP address are generally remote protocols (e.g., tunneling protocols, encryption protocols, remote desktop protocol (RDP), etc.), this could indicate a command and control role.

In some instances, based on the DNS analysis described above and additional information such as, for example, patterns of movement or non-movement, services running on the host, the reputation of the service provider, relationships between malware and the infrastructure or service provider, the malicious infrastructure classification device 101 (e.g., a processor of the malicious infrastructure classification device 101) can identify a probabilistic rating (or a confidence value). The probabilistic rating for a specific infrastructure can be compared to a threshold to identify and/or characterize that infrastructure (e.g., IP address, domain, network ASN, service providers, etc.) as described above.

In some instances, the DNS resolution information described above can be combined with other information such as personal activity data to identify an identity and/or status pattern associated with an adversary (or an operator of the malicious software campaign). Specifically, personal activity data such as social media posts, personal or cultural significant events, and/or the like can be combined with an activity timeline associated with the DNS resolution information. Based on the DNS resolution information and activity corresponding to gathered data (e.g., personal activity data), an identity of the adversary and/or the network exploitation operator can be identified. For example, periods of inactivity in the malicious software campaign can be mapped and/or correlated with significant events (e.g., holidays, weddings, etc.) in an operator's life (as represented by personal activity data). Based on the status pattern and significant events, the identity can be identified.

Figure 2:
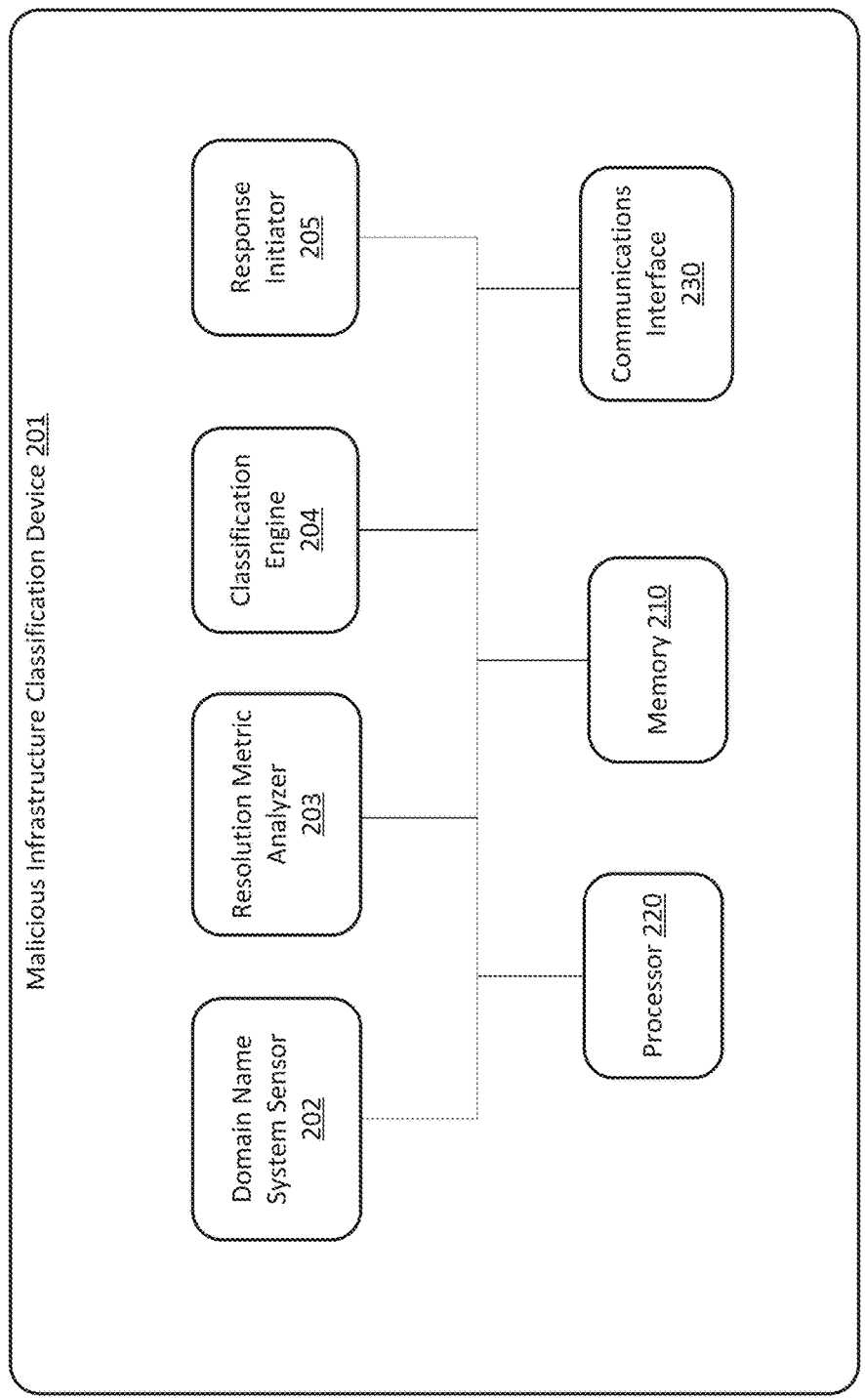
FIG. 2 is a schematic block diagram of a malicious infrastructure classification device, according to an embodiment.

FIG. 2 is a schematic block diagram of a malicious infrastructure classification device 201, according to an embodiment. The malicious infrastructure classification device 201 (such as the malicious infrastructure classification device 101 in FIG. 1) can include a domain name system (DNS) sensor 202, a resolution metric analyzer 203, a classification engine 204, a response initiator 205, a processor 220, a memory 210, and a communications interface 230. The malicious infrastructure classification device 201 can be structurally and functionally similar to the malicious infrastructure classification device 101 discussed with respect to FIG. 1. Each operation(s) of the domain name system (DNS) sensor 202, the resolution metric analyzer 203, the classification engine 204, the response initiator 205, the communications interface 219, as well as the memory 210, can be controlled by the processor 220. Each module or component (e.g., analyzer, engine, initiator, interface) in the malicious infrastructure classification device 201 can be one or more hardware modules and/or software modules (e.g., stored in memory and executed by a processor). Each module or component in the malicious infrastructure classification device 201 can be any combination of hardware-based module(s) (e.g., a field-programmable gate array (FPGA), an application specific integrated circuit (ASIC), a digital signal processor (DSP)) and/or software-based module(s) (e.g., a module of computer code stored in memory 210 and/or executed at the processor 220) capable of performing one or more specific functions associated with that module or component. Each module or component in the malicious infrastructure classification device 201 can be operatively coupled to the other modules/components in the malicious infrastructure classification device 201. As discussed herein, the malicious infrastructure classification device 201 and its modules or components can be stored and/or executed on a server, host device, client device, and/or the like. In some embodiments, some modules or components of the malicious infrastructure classification device 201 can be stored and/or executed on a first device (e.g., a server) and other modules or components of the malicious infrastructure classification device 201 can be stored and/or executed on a second device (e.g., a client device) operatively coupled to the first device via a network (e.g., the Internet).

The DNS sensor 202 can be structurally and functionally similar to the DNS sensor 131 described with respect to FIG. 1. The DNS sensor 202 can collect information that translates (maps, associates) the malicious domain name to an IP address or an IP address to a domain name. In some instances, a malicious domain name can be uniquely associated with a static IP address. In other words, the infrastructure that hosts the domain name remains the same. In other instances, for example, the malicious software campaign can dynamically change the infrastructure that hosts the malicious domain name, and thus, the IP address associated with the infrastructure changes over time. In some implementations, the DNS sensor 202 can collect domain name resolution information associated with a malicious domain, such as different IP addresses to which a specific malicious domain resolves over time (i.e., a timeline of resolutions), an amount of time or duration the malicious domain resolves to each IP address before resolving to another IP address, the geographic location associated with each IP address to which the malicious domain resolves, the server provider reputation based on prior domain name resolutions, a number of DNS resolutions for that specific location over a period of time, and/or services (open ports or port services) used by the host (i.e., malicious infrastructure). In addition to such DNS resolution information, DNS sensor 202 can also collect and/or receive additional contextual information (e.g., geolocation information, autonomous system number (ASN) information, etc.) or derivative metrics (e.g., the total time associated with DNS resolutions within a particular geographic location, total number of unique IP addresses used within a specific geographic location, the number of times each IP address is used, and/or a time of a day of each resolution to a geographic location within the time period (e.g., morning, afternoon, night).

In some implementations, the DNS sensor 202 can be configured to actively send queries to, for example, a domain name system, a DNS database, an ISP, and/or any compute device within a network (such as the network 150 in FIG. 1), to collect domain name resolution data and/or perform domain name resolutions (e.g., translate a domain name to an IP address, or translate an IP address to a domain name). In some implementations, the DNS sensor 202 does not actively send DNS queries. Instead, the DNS sensor 202 can passively receive domain name resolution data, for example, by monitoring the network traffic when other entities (e.g., the malicious infrastructure classification device 201, the DNS, the ISP, and/or any compute device within the network) query the DNS.

The resolution metric analyzer 203 can be configured to determine a set of resolution metrics based on the DNS resolution information (e.g., the timeline of resolutions) collected by the DNS sensor 202. In some implementations, the DNS sensor 202 can send the timeline of resolutions to the resolution metric analyzer 203 and the resolution metric analyzer 203 can analyze the timeline of resolutions to determine the set of resolution metrics. In another implementation, the DNS sensor 202 can determine a set (or a subset) of resolution metrics based on the timeline of resolutions and send the timeline of resolutions and the set (or the subset) of resolution metrics to the resolution metric analyzer 203 to determine more resolution metrics. In some implementations, the resolution metric analyzer 203 can obtain resolution metrics and/or DNS resolution information from one or more additional sensors instead of or in addition to the DNS sensor 202 at the malicious infrastructure classification device 201. For example, the resolution metric analyzer 203 can obtain resolution metrics and/or DNS resolution information from DNS sensors positioned at different places in a network and/or DNS sensors controlled by different parties.

In some implementations, the resolution metric analyzer 203 can normalize the DNS resolution data and concatenate the normalized data together. Based on the normalized DNS resolution information (e.g., the timeline of resolutions), the resolution metric analyzer 203 can determine the set (or subset) of resolution metrics, including an amount of time or duration the malicious domain resolves to each IP address before resolving to another IP address, the geographic location associated with each IP address to which the malicious domain resolves, a number of DNS resolutions for that specific location over a period of time, the total time associated with DNS resolutions within a particular geographic location, the total number of unique IP addresses used within a specific geographic location, the number of times each IP address is used, and/or a time of a day of each resolution to a geographic location within the time period (e.g., morning, afternoon, night).

The classification engine 204 can be configured to compare the set of resolution metrics of the set of geographic locations and classify adversary infrastructure at the set of geographic locations. Specifically, the classification engine 204 can receive the set of resolution metrics from the resolution metric analyzer 203. In some implementations, the classification engine 204 can identify outlier IP addresses (i.e., IP address that are used by the malicious software campaign differently from other IP addresses) using resolution metric ratios (e.g., the resolution metric ratios shown and described with respect to FIGS. 3 and 4). In some implementations, the classification engine 204 can compare a resolution metric of a first geographic location with the resolution metric of a second geographic location to determine a ratio. In another implementation, the classification engine 204 can compare a first resolution metric of a specific geographic location with a second resolution metric of the specific geographic location to determine a ratio. In yet another implementation, the classification engine 204 can compare a resolution metric of a geographic location from a set of geographic locations with a collective value (or an average value) of the resolution metric associated with the set of geographic locations to determine a ratio.

Based on the ratio (or ratios), the classification engine 204 can determine a pattern or a role of an adversary infrastructure at a geographic location. Varying ratios among the resolution metrics reflect the geographic location's purpose, function, role, and status, within the larger infrastructure or the malicious software campaign. A role of an adversary infrastructure in the malicious software campaign can include, but not limited to, a central-hub role, a parking role, a target role, an entrusted role, a suspicious role, a source origin role, a midpoint role, a midpoint redirector role, a midpoint C2 role, and/or the like. A status of an adversary infrastructure in the malicious software campaign can include, but not limited to, active, inactive, abandoned, parked, and/or the like. In some implementations, the malicious infrastructure classification device 101 (e g., a processor of the malicious infrastructure classification device 101) can identify a role (or multiple roles) of the adversary infrastructure at a geographic location based on one ratio or more than one ratio. In some implementations, instead of being determined by the ratios, the role of the adversary infrastructure can also be self-defined or self-characterized by a user.

For example, a high ratio of resolutions for a given location (e.g., Kunming as described with respect to FIGS. 3-4) indicates a high level of access, control, and comfort for an operator of the malicious software campaign (also referred to herein as "a central hub role"). A low ratio of unique IPs for a given location (e.g., Denver as described with respect to FIGS. 3-4), together with a high ratio of time spent resolving to the IPs for the given location, indicates that the infrastructure at the given location is likely used when the malicious domain is offline for a given time or the malicious domain is not interacting with routable infrastructure (also referred herein to as "a parking role"). When a pattern of brief, periodic resolutions to recurring IPs in a given location is observed, it can indicate quick connectivity checks by the operator of the malicious software campaign to see if the target devices are beaconing in or the presence of unfavorable operational conditions. Thus, this can indicate a location (e.g., Bangkok as described with respect to FIGS. 3-4) being targeted by the adversary.

The response initiator 205 can be configured to determine, based on the role of the adversary infrastructure classified by the classification engine 204 and a response policy, a remedy response associated with at least one of the set of IP addresses to which the malicious domain resolves or the domain name. For example, if the adversary infrastructure at a location is determined to be a central-hub role and the adversary infrastructure is associated with a subset of IP addresses, the response initiator 205 can query the response policy (e.g., stored at memory 210) and determine a remedy response to blacklist the subset of IP addresses to block future communications to/from the subset of IP addresses or the malicious domain. For another example, if the adversary infrastructure at a location is determined to be a parking role, the response initiator 205 can query the response policy and determine a remedy response to monitor the subset of IP addresses associated with the adversary infrastructure. If such adversary infrastructure changes from a parking role to an active role, the response initiator 205 can initiate a remedy response to blacklist the subset of IP addresses or the malicious domain. For yet another example, if the adversary infrastructure at a location is determined to be a target role, the response initiator 205 can query the response policy and determine a remedy response to suspend communications to the subset of IP addresses associated with the target devices for a period of time.

The communications interface 230 of the malicious infrastructure classification device 201 can include, for example, at least one port (not shown in FIG. 2.) that can be used to implement one or more wired or wireless connections between the malicious infrastructure classification device 201 and one or more devices of networks (not shown in FIG. 2). As such, the malicious infrastructure classification device 201 can be configured to receive data and/or send data through one or more ports of the communications interface 230, which are connected with the communications interfaces of one or more devices of networks (not shown in FIG. 2).

The memory 210 can be, for example, a random-access memory (RAM) (e.g., a dynamic RAM, a static RAM), a flash memory, a removable memory, a hard drive, a database and/or so forth. In some implementations, the memory 210 can include (or store), for example, a database, process, application, virtual machine, and/or some other software modules (stored and/or executing in hardware) and/or hardware modules configured to execute a malicious infrastructure classification process and/or one or more associated methods for the malicious infrastructure classification device 201. In such implementations, instructions for executing the malicious infrastructure classification process and/or the associated methods can be stored within the memory 210 and executed at the processor 220.

The processor 220 can be configured to, for example, write data into and read data from the memory 210, and execute the instructions stored within the memory 210. The processor 220 can also be configured to execute and/or control, for example, the operations of the DNS sensor 202, the resolution metric analyzer 203, the classification engine 204, the response initiator 205, and the communications interface 219. In some implementations, based on the methods or processes stored within the memory 210, the processor 220 can be configured to execute the malicious infrastructure classification processes, as described in FIG. 5.

Figure 5:
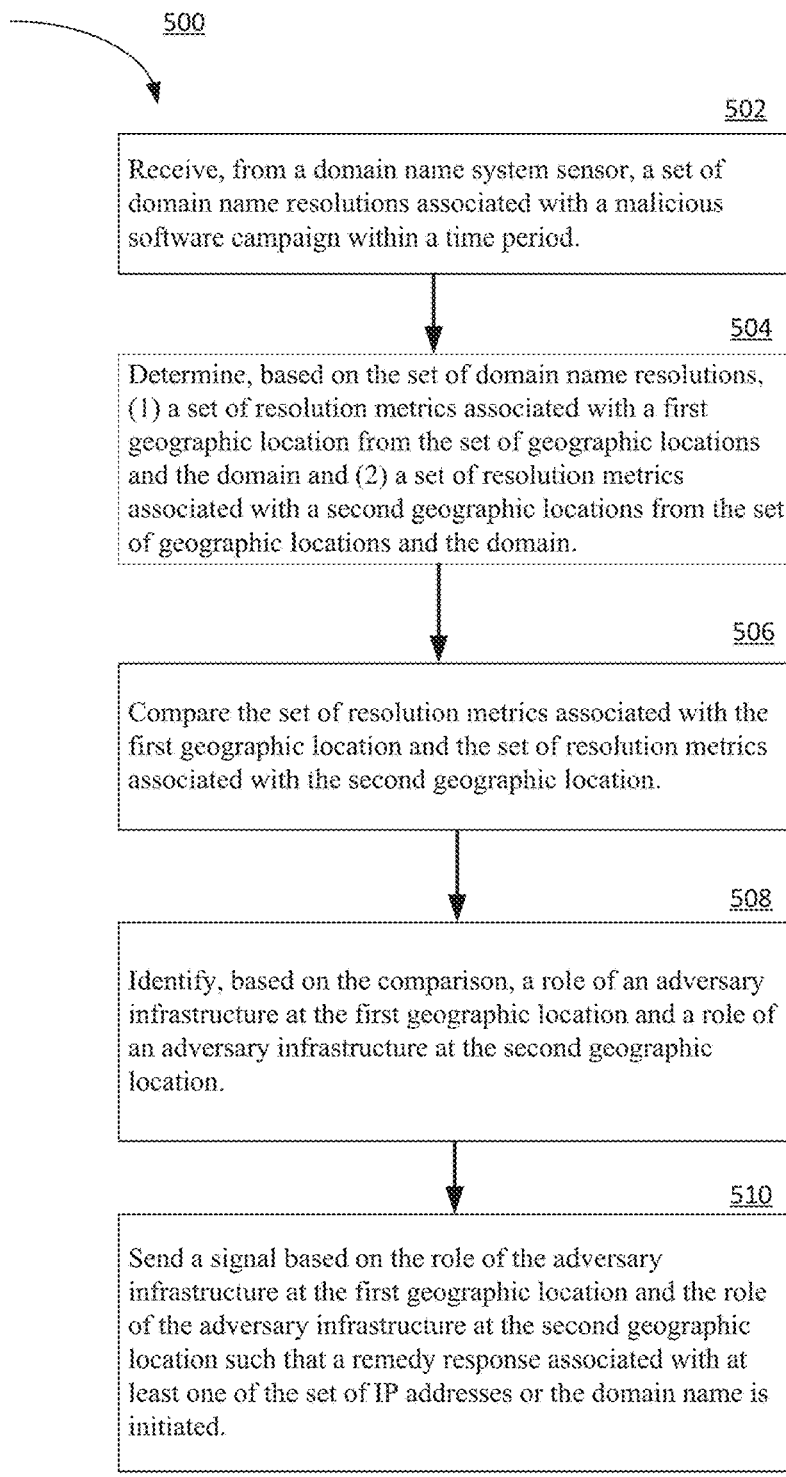
FIG. 5 is a flowchart illustrating a malicious infrastructure classification process, according to an embodiment.

FIG. 5 is a flowchart illustrating a malicious infrastructure classification process, according to an embodiment. This method 500 can be implemented at a processor using code stored in a memory (e.g., processor 220 and memory 210 as discussed with respect to FIG. 2) of a security device (such as the malicious infrastructure classification device 201 in FIG. 2). In some instances, the malicious infrastructure classification process 500 can be used to analyze, determine, and/or classify adversary infrastructure that host a malicious domain in a malicious software campaign such that knowledge about adversary infrastructure and such that the malicious domain can be obtained and actions can be taken to prevent future malware attacks.

At 502, a processor (e.g., processor 220 in FIG. 2) receives, from a domain name system sensor (e.g., DNS sensor 202 in FIG. 2), a set of domain name resolutions associated with a domain (or a malicious domain, or a domain name, or a malicious domain name) within a time period. Each domain name resolution from the set of domain name resolutions includes a mapping between a domain name and an Internet Protocol (IP) address from a set of IP addresses at a time stamp within the time period. Each IP address from the set of IP addresses is associated with a geographic location from a set of geographic locations.

The set of domain name resolutions can also include one of a mapping from an IP address to a domain name, the geographic location associated with each IP address to which the malicious domain resolves, the server provider reputation based on resolutions, services (open ports or port services) used by the host (i.e., adversary infrastructure), geolocation information, autonomous system number (ASN) information and/or the like. In some implementations, the DNS sensor can actively send queries to, for example, a domain name system, to collect the set of domain name resolutions. In some implementations, the DNS sensor can passively receive domain name resolution data, for example, by monitoring the network.

At 504, the processor determines, based on the set of domain name resolutions, a set of resolution metrics associated with a first geographic location from the set of geographic locations and the domain and a set of resolution metrics associated with a second geographic location from the set of geographic locations and the domain. The set of resolution metrics includes at least one of an amount of time or duration the malicious domain resolves to each IP address before resolving to another IP address, the geographic location associated with each IP address to which the malicious domain resolves, a number of DNS resolutions for that specific location over a period of time, the total time associated with DNS resolutions within a particular geographic location, the total number of unique IP addresses used within a specific geographic location, the number of times each IP address is used, and/or a time of a day of each resolution to a geographic location within the time period (e.g., morning, afternoon, night).

At 506, the processor compares the set of resolution metrics associated with the first geographic location and the set of resolution metrics associated with the second geographic location. Specifically, the processor can identify outlier IP addresses (i.e., IP addresses that are used by the malicious software campaign differently from other IP addresses). In some implementations, the processor compares a resolution metric of a first geographic location with the resolution metric of a second geographic location to determine a ratio. In another implementation, the processor compares a first resolution metric of a specific geographic location with a second resolution metric of the specific geographic location to determine a ratio. In yet another implementation, the processor compares a resolution metric of a geographic location from a set of geographic locations with a collective value (or an average value) of the resolution metric associated with the set of geographic locations to determine a ratio.

At 508, the processor identifies, based on the comparison, a role of an adversary infrastructure at the first geographic location and a role of an adversary infrastructure at the second geographic location. Based on the ratio (or ratios), the processor determines a pattern or a role of an adversary infrastructure at a geographic location. Varying ratios among the resolution metrics reflect the geographic location's purpose, function, role, and/or status, within the larger infrastructure or the malicious software campaign. A role of an adversary infrastructure in the malicious software campaign can include, but is not limited to, a central-hub role, a parking role, a target role, an untrusted role, a suspicious role, a source origin role, a midpoint role, a midpoint redirector role, a midpoint C2 role, and/or the like. A status of an adversary infrastructure in the malicious software campaign can include, but is not limited to, active, inactive, abandoned, parked, and/or the like. In some implementations, the processor identifies a role of the adversary infrastructure at a geographic location based on one ratio or more than one ratio. In some implementations, instead of being determined by the ratios, the role of the adversary infrastructure can also be self-defined or self-characterized by a user.

For example, a high ratio of resolutions for a given location (e.g., Kunming as described with respect to FIGS. 3-4) indicates a high level of access, control, and comfort for an operator of the malicious software campaign (also referred to herein as "a central hub role"). A low ratio of unique IP addresses for a given location (e.g., Denver as described with respect to FIGS. 3-4), together with a high ratio of time spent resolving to the IP addresses for the given location, indicates that the infrastructure at the given location is likely used when the malicious domain is offline for a given time or the malicious domain is not interacting with routable infrastructure (also referred herein to as "a parking role"). When a pattern of brief, periodic resolutions to recurring IP addresses in a given location is observed, it can indicate quick connectivity checks by the operator of the malicious software campaign to see if the target devices are beaconing in or the presence of unfavorable operational conditions. Thus, this can indicate a location (e.g., Bangkok as described with respect to FIGS. 3-4) being targeted by the adversary.

At 510, the processor sends a signal based on the role of the adversary infrastructure at the first geographic location and the role of the adversary infrastructure at the second geographic location such that a remedy response associated with at least one of the set of IP addresses or the domain name is initiated. For example, if the adversary infrastructure at a location is determined to be a central-hub role and the adversary infrastructure is associated with a subset of IP addresses, the processor can query a response policy and determines a remedy response to send a signal to blacklist the subset of IP addresses to block future communications to/from the subset of IP addresses or the malicious domain. For another example, if the adversary infrastructure at a location is determined to be a parking role, the processor can determine a remedy response and can send a signal to monitor the subset of IP addresses associated with the adversary infrastructure. If such adversary infrastructure changes from a parking role to an active role, the processor can send a signal to blacklist the subset of IP addresses or the malicious domain. For yet another example, if the adversary infrastructure at a location is determined to be a target role, the processor can send a signal to suspend communications to the subset of IP addresses associated with the target devices for a period of time.

While described above as classifying a role and/or status of the infrastructure at a geographic location, in other instances, the role and/or status of specific devices can be classified. For example, specific host devices within the same geographic location and/or area can be classified differently based on their resolution metrics and/or other characteristics.

While described above as analyzing domain name resolutions associated with a single domain, in other instances the domain name resolution information and/or data can be analyzed for a group or set of domains. Specifically, for example, where multiple domains are known to be associated with a specific malicious software campaign, domain name resolution information can be collected and used with respect to each of these domains when classifying the infrastructure associated with that malicious software campaign.

Some embodiments described herein relate to devices (e.g., access points, mobile communication devices) with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, JavaScript, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. An apparatus, comprising:
   a memory; and
   a processor operatively coupled to the memory, the processor configured to:
   receive, from a domain name system sensor, a set of domain name resolutions associated with a domain within a time period, each domain name resolution from the set of domain name resolutions including a mapping between a domain name and an Internet Protocol (IP) address from a set of IP addresses at a time stamp within the time period, each IP address from the set of IP addresses is associated with a geographic location from a set of geographic locations;
   determine, based on the set of domain name resolutions, (1) a set of resolution metrics associated with a first geographic location from the set of geographic locations and the domain and (2) a set of resolution metrics associated with a second geographic location from the set of geographic locations and the domain, the set of resolution metrics associated with the first geographic location includes at least one of a number of resolutions to the first geographic location within the time period, a duration of each resolution to the first geographic location within the time period, a collective duration of resolutions to the first geographic location within the time period, a number of unique IP addresses associated with the first geographic location used within the time period, a time of a day of each resolution to the first geographic location within the time period, or a port service type of each resolution to the first geographic location within the time period;

compare the set of resolution metrics associated with the first geographic location and the set of resolution metrics associated with the second geographic location;

identify, based on the comparison, a role of an adversary infrastructure at the first geographic location and a role of an adversary infrastructure at the second geographic location, the role of the adversary infrastructure at the first geographic location includes at least one of a central hub role, a parking role, a target role, an untrusted role, a source origin role, a midpoint role, a midpoint redirector role, a midpoint command and control role, or a suspicious role; and send a signal based on the role of the adversary infrastructure at the first geographic location and the role of the adversary infrastructure at the second geographic location such that a remedy response associated with at least one of the set of IP addresses or the domain name is initiated.

2. The apparatus of claim 1, wherein:
the set of resolution metrics associated with the first geographic location includes a number of resolutions to the first geographic location within the time period,
the set of resolution metrics associated with the second geographic location includes a number of resolutions to the second geographic location within the time period,
the processor is configured to compare the number of resolutions to the first geographic location and the number of resolutions to the second geographic location to determine a ratio,
the processor is configured to identify, based on the ratio, a central hub role of the adversary infrastructure at the first geographic location and a parking role of the adversary infrastructure at the second geographic location.

3. The apparatus of claim 1, wherein the domain name system sensor is an active domain name system sensor.

4. The apparatus of claim 1, wherein the domain name system sensor is a passive domain name system sensor.

5. The apparatus of claim 1, wherein the processor is configured to determine a confidence value associated with the role of the adversary infrastructure at the first geographic location.

6. The apparatus of claim 1, wherein:
the processor is configured to receive personal activity data within the time period associated with an operator,
the processor is configured to determine, based on the set of domain name resolutions and the personal activity data, an identity of the operator.

7. The apparatus of claim 1, wherein the mapping between the domain name and the IP address is identified based on a reverse domain name lookup using the IP address as an input.

8. The apparatus of claim 1, wherein the processor is configured to identify, based on the comparison, a status of the adversary infrastructure at the first geographic location as at least one of active, inactive, abandoned or parked.

9. An apparatus, comprising:
a memory; and
a processor operatively coupled to the memory, the processor configured to:

receive, from a domain name system sensor, a set of domain name resolutions associated with a domain within a time period, each domain name resolution from the set of domain name resolutions including a mapping between a domain name and an Internet Protocol (IP) address from a set of IP addresses at a time stamp within the time period, each IP address from the set of IP addresses is associated with a geographic location from a set of geographic locations;

determine, based on the set of domain name resolutions, a set of resolution metrics associated with (1) the domain and (2) a geographic location from the set of geographic locations, the set of resolution metrics including a first resolution metric associated with the geographic location and a second resolution metric associated with the geographic location, the set of resolution metrics including at least one of a number of resolutions to the geographic location within the time period, a duration of each resolution to the geographic location within the time period, a collective duration of resolutions to the geographic location within the time period, a number of unique IP addresses associated with the geographic location used within the time period, a time of a day of each resolution to the geographic location within the time period, or a port service type of each resolution to the geographic location within the time period;

determine a ratio between the first resolution metric and the second resolution metric;

identify, based on the ratio, a role of an adversary infrastructure at the geographic location, the role of the adversary infrastructure at the geographic location includes at least one of a central hub role, a parking role, a target role, an untrusted role, a source origin role, a midpoint role, a midpoint redirector role, a midpoint command and control role, or a suspicious role; and send a signal based on the role of the adversary infrastructure at the geographic location such that a remedy response associated with the adversary infrastructure at the geographic location is initiated.

10. The apparatus of claim 9, wherein:
the geographic location is a first geographic location from the set of geographic locations,
the processor is configured to determine, based on the set of domain name resolutions, a set of resolution metrics associated with a second geographic location from the set of geographic locations,
the processor is configured to compare the set of resolution metrics associated with the first geographic location and the set of resolution metrics associated with the second geographic location,
the processor is configured to identify, based on the comparison, a role of an adversary infrastructure at the second geographic location,
the processor is configured to send a signal based on the role of the adversary infrastructure at the first geographic location and the role of the adversary infrastructure at the second geographic location such that a remedy response associated with the adversary infrastructure at the second geographic location is initiated.

11. The apparatus of claim 9, wherein:
the geographic location is a first geographic location from the set of geographic locations, the role of the adversary infrastructure at the first geographic location is a first role of the adversary infrastructure at the first geographic location, the processor is configured to determine a set of resolution metrics associated with a second geographic location from the set of geographic locations, the set of resolution metrics associated with the first geographic location includes a duration of resolutions within the time period to the first geographic location, the set of resolution metrics associated with the second geographic location includes a duration of resolutions within the time period to the second geographic location, the processor is configured to compare the duration of resolutions within the time period to the first geographic location and the duration of resolutions within the time period to the second geographic location to determine a duration ratio, the processor is configured to identify, based on the duration ratio, a second role of the adversary infrastructure at the first geographic location and a role of the adversary infrastructure at the second geographic location.

12. The apparatus of claim 9, wherein the domain name system sensor is an active domain name system sensor.

13. The apparatus of claim 9, wherein the domain name system sensor is a passive domain name system sensor.

14. The apparatus of claim 9, wherein the processor is configured to determine a confidence value associated with the role of the adversary infrastructure at the geographic location.

15. The apparatus of claim 9, wherein the processor is configured to identify the role of the adversary infrastructure at the geographic location based at least in part on services provided by a service provider associated with the set of IP addresses or a historic reputation associated with the service provider.

16. A non-transitory processor-readable medium storing code representing instructions to be executed by a processor, the code comprising code to cause the processor to:

receive, from a domain name system sensor, a set of domain name resolutions associated with a domain within a time period, each domain name resolution from the set of domain name resolutions including a mapping between a domain name and an Internet Protocol (IP) address from a set of IP addresses at a time stamp within the time period, each IP address from the set of IP addresses is associated with the domain and a geographic location from a set of geographic locations;

determine, based on the set of domain name resolutions, a resolution metric from a set of resolution metrics associated with each geographic location from the set of geographic locations, the set of resolution metrics associated with each geographic location from the set of geographic locations includes at least one of a number of resolutions to that geographic location within the time period, a duration of each resolution to that geographic location within the time period, a collective duration of resolutions to that geographic location within the time period, a number of unique IP addresses associated with that geographic location used within the time period, a time of a day of each resolution to that geographic location within the time period, or a port service type of each resolution to that geographic location within the time period;

determine a ratio between the resolution metric associated with a specific geographic location from the set of geographic locations and a collective value of the resolution metric associated with the set of geographic locations;

identify, based on the ratio, a role of an adversary infrastructure at the specific geographic location, the role of the adversary infrastructure at the specific geographic location includes at least one of a central hub role, a parking role, a target role, an untrusted role, a source origin role, a midpoint role, a midpoint redirector role, a midpoint command and control role, or a suspicious role; and send a signal based on the role of the adversary infrastructure at the specific geographic location such that a remedy response associated with adversary infrastructure at the specific geographic location is initiated.

17. The non-transitory processor-readable medium of claim 16, wherein the domain name system sensor is an active domain name system sensor.

18. The non-transitory processor-readable medium of claim 16, wherein the processor is configured to determine a confidence value associated with the role of the adversary infrastructure at the specific geographic location.

19. The non-transitory processor-readable medium of claim 16, wherein:

the specific geographic location is a first geographic location from the set of geographic locations, the ratio is a first ratio, the processor is configured to determine a second ratio between the resolution metric associated with a second geographic location from the set of geographic locations and the collective value of the resolution metric associated with set of geographic locations, the code to cause the processor to identify includes code to cause the processor to identify, based on the first ratio and the second ratio, the role of the adversary infrastructure at the first geographic location and a role of an adversary infrastructure at the second geographic location.

* * * * *